UNITED STATES PATENT OFFICE.

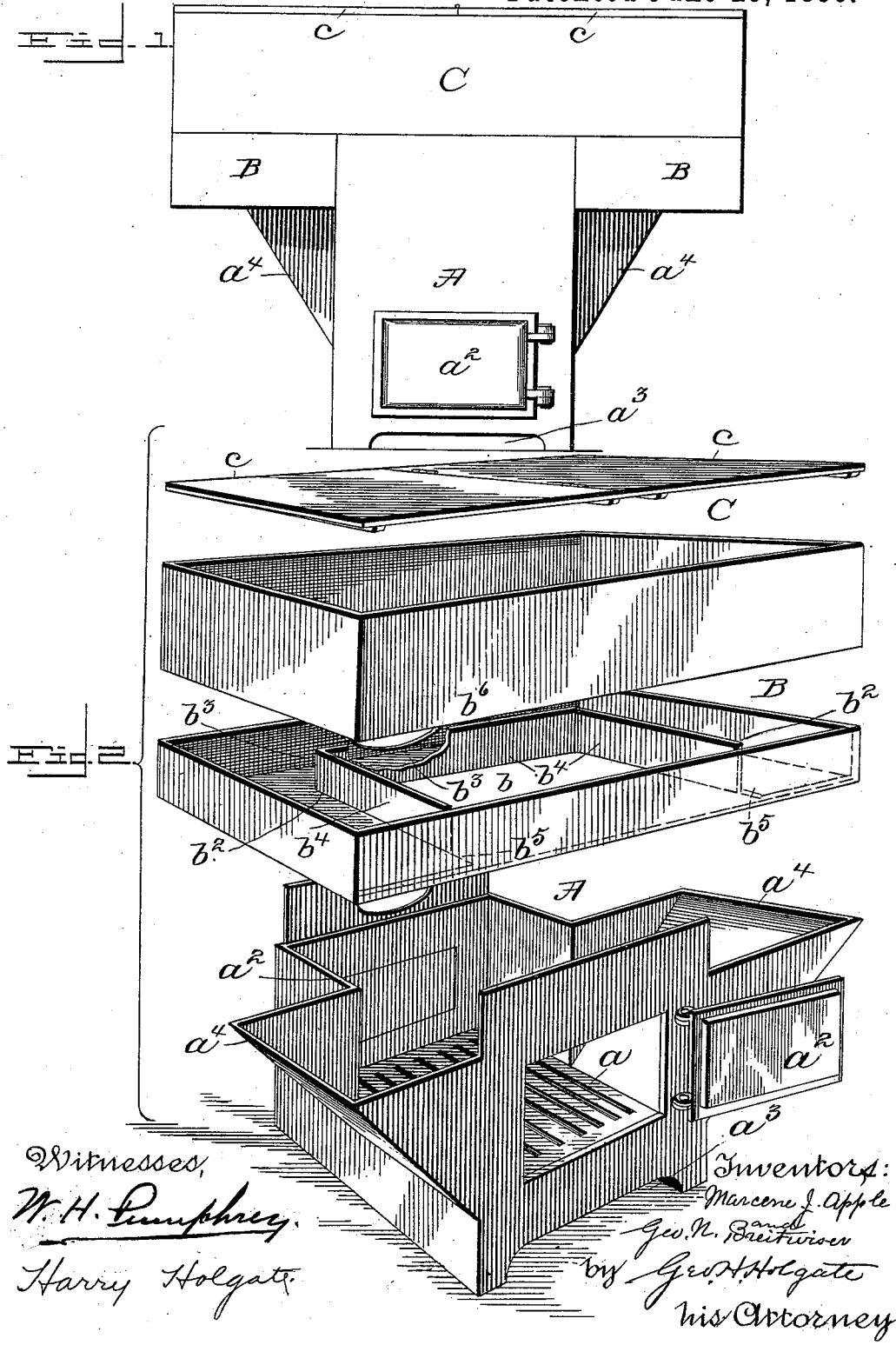

MARCENE J. APPLE AND GEORGE N. BREITWISER, OF REPUBLIC, OHIO.

FOOD-COOKER.

SPECIFICATION forming part of Letters Patent No. 541,703, dated June 25, 1895.

Application filed August 30, 1894. Serial No. 521,712. (No model.)

*To all whom it may concern:*

Be it known that we, MARCENE J. APPLE and GEORGE N. BREITWISER, citizens of the United States, residing at Republic, county of Seneca, and State of Ohio, have invented new and useful Improvements in Food-Cookers, of which the following is a specification.

The invention relates to food cookers.

The object is to produce an apparatus for steaming or boiling food for cattle and for evaporating or other purposes, in which, by a peculiar arrangement of flues, an equable distribution of heat will be secured, and high efficiency obtained with a minimum consumption of fuel.

With this object in view, the invention consists in a cooker, comprising a furnace, a receptacle supported above and serving as a top to the furnace, and flues leading from opposite sides of the furnace, beneath the receptacle, rearward, to a common uptake, whereby the products of combustion, in passing from the furnace to the uptake, are directed in a manner, to become evenly distributed over the entire bottom of the receptacle; furthermore, in a cooker, comprising a furnace having its opposite sides flared outward, a receptacle supported above and serving as a top to the furnace, and flues arranged beneath the receptacle and forming continuations of the flared portions, whereby the products of combustion are led upward and forward into the flues, thence rearward, beneath and adjacent the ends of the receptacle, into an uptake, common to the flues; and finally in details of construction.

The invention is illustrated in the accompanying drawings, forming part of this specification and in which like letters of reference indicate corresponding parts in both views.

Figure 1 is a view in front elevation, of one embodiment of the invention. Fig. 2 is a view in perspective, showing sections of the apparatus, separated and arranged relatively one above the other.

In the drawings: A, designates the furnace, which may be of any well-known construction and design, but is preferably as shown, being approximately square, open at the top and provided with a grate $a$, a door $a^2$, leading in above the grate, through which fuel is introduced, and an ash pit $a^3$, below the grate. At or near the front of the furnace, portions of the side walls are flared outward, forming enlargements $a^4$.

B, represents a superstructure or flue casing, which may be integral with or removably secured upon either the furnace or the food-holding receptacle or may be and preferably is a separate casing as shown in Fig. 2 of the drawings. This casing, also open at the top, is, as shown, adapted to fit down upon the furnace, its bottom being cut away at $b$, directly above the grate and flared portions of the furnace walls, from the front wall of the casing, toward the rear, sufficient space being left at sides and rear, for flues $b^2$, and $b^3$, formed by a vertical flange or wall $b^4$, extending around the opening. At or adjacent the front wall of the casing, are openings $b^5$, in the flanges at opposite sides of main opening, through which the products of combustion from the furnace, pass into the flues and are carried rearward to the end flue, and escape by way of an uptake $b^6$, leading therefrom.

C, represents a receptacle, suitable for holding food or other substance to be steamed or boiled. This receptacle is designed to be seated upon the flue casing, so as to completely cover the same, and is provided with a removable cover $c$, formed solid or in hinged sections.

It will be apparent that a number of interchangeable receptacles may be used in connection with the furnace, and if found desirable, each may have formed integral therewith, a flue casing, similar to that above described, it being immaterial to which section the flue casing is fixed; but it is preferable that the flue casing be separate from the furnace and the receptacle, inasmuch as the device would be of greater use, with a less quantity of weight, especially when it is desired to have a number of interchangeable receptacles, and where it is desirous to change the location of the cooker. By the use of a separable flue casing, it is also obvious that should one of the flues become broken a new flue casing could be readily inserted and it is also desirable to have a separable and removable flue casing, as it is often desirous that a flue of different size, &c., be used, especially when it is desired to vary the heat distribution of the furnace. It may also be desired to have a direct heat on the receptacle in which case the flue casing would be entirely removed from the cooker and the receptacle be placed directly on the furnace.

Among the important advantages of the invention may be mentioned: its extreme simplicity of construction and low cost of manufacture, as well as its strength and durability, and its effectiveness in operation.

Having thus described our invention, what we claim as new, and desire to secure by Letters Patent, is—

A cooker comprising a furnace having its opposite sides flared outward and having a portion of its front and rear walls extending upward above the level of said flared portions; a flue casing removably mounted on said furnace between said front and rear wall extensions said flue casing comprising a rectangular pan-shaped superstructure, having a rectangular opening at its center, and having flanges extending upward from said opening to a height equal to the height of said superstructure said flanges being located at the sides and rear of said opening, the space between said superstructure and said flanges forming flues extending from the front of said casing, around said flanges, to an opening formed in the rear wall of said superstructure and serving as an outlet for the products of combustion; and a receptacle mounted on said flue casing, in such manner as will cause an equable distribution of the heat to said receptacle, substantially as and for the purpose described.

In testimony whereof we have hereunto affixed our signatures in the presence of two witnesses.

MARCENE J. APPLE.
GEORGE N. BREITWISER.

Witnesses:
ADAM T. BREITWISER,
FREDERICK S. WARNER.